UNITED STATES PATENT OFFICE.

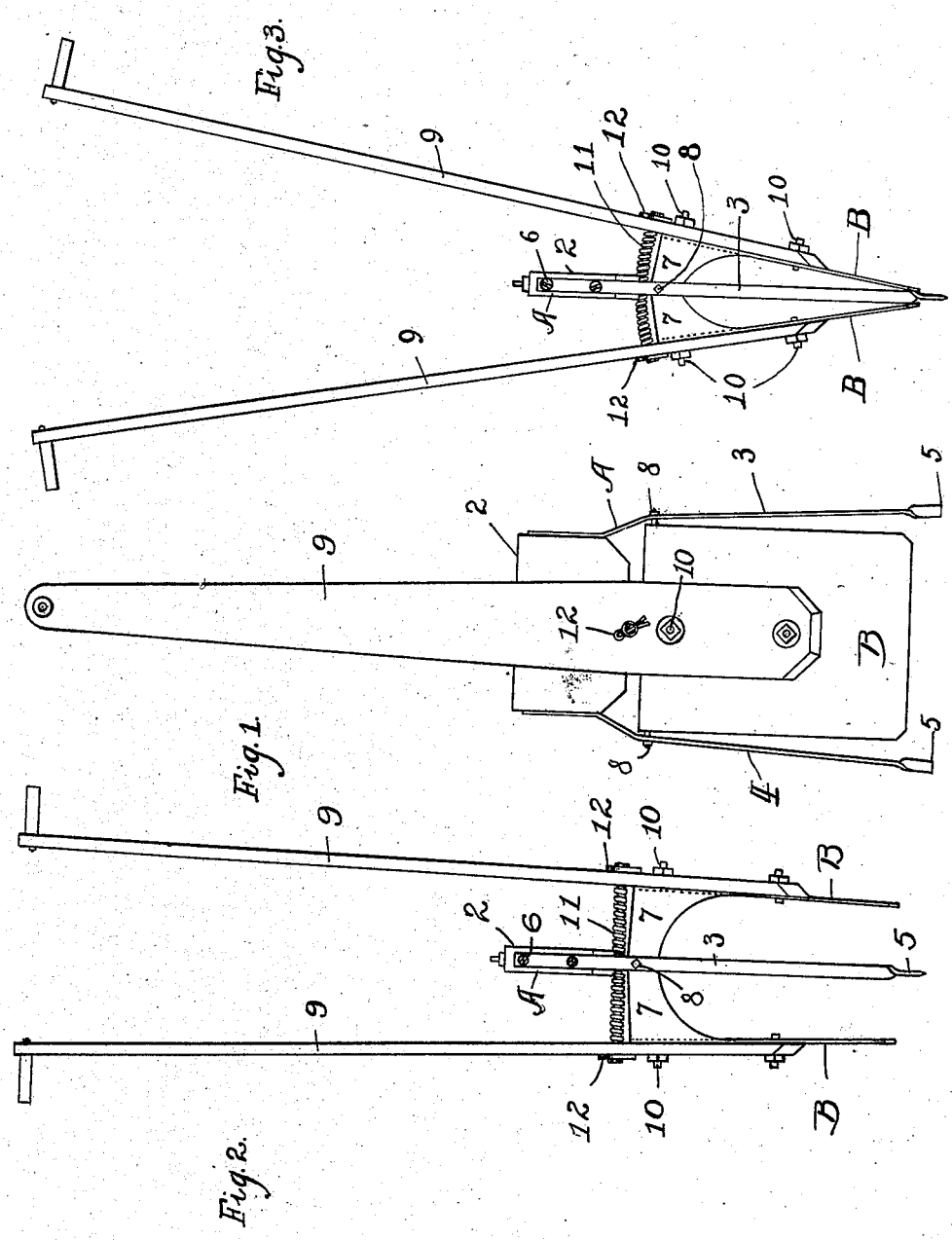

FRANK VEJROSTA, OF SILVER LAKE, MINNESOTA.

HOEING IMPLEMENT.

No. 892,968.　　　Specification of Letters Patent.　　　Patented July 7, 1908.

Application filed September 17, 1907. Serial No. 393,257.

*To all whom it may concern:*

Be it known that I, FRANK VEJROSTA, a citizen of the United States, residing at Silver Lake, in the county of McLeod and State of Minnesota, have invented a new and useful Improvement in Hoeing Implements, of which the following is a specification.

My invention relates to improvements in hoeing implements and has for its primary object a device of its kind which is more particularly adapted for hoeing corn and which reduces hand labor.

This device is used for removing weeds from around young growing corn and its construction is simple and inexpensive as compared with prior art devices used for this purpose.

In the accompanying drawings forming part of this specification, Figure 1 is a side elevation of my invention; Fig. 2 is an end elevation showing the blades normally apart, and Fig. 3 is another end elevation showing the blades together.

In the drawings A represents a yoke frame comprising a head block 2 and a pair of legs 3 and 4, the lower ends of which are pointed at 5 so that they can be easily inserted in the ground on opposite sides of a hill of corn for holding the device steady. The upper ends of the legs are attached to the head block by screws 6.

B—B represent a pair of hoeing blades, the upper ends of which are formed with inturned flanges 7. These blades are suspended within the yoke upon a pivot bolt 8 passing through the legs 3 and 4 of the yoke and the flanges 7 of the hoeing blades. Each hoeing blade is provided with an upwardly-extending handle 9 which is secured thereto by means of bolts 10. These handles are adapted for swinging the lower ends of the blades together. A helical drawspring 11 above the pivot bolt 8 and secured at its ends to said handles by means of the pins 12 is adapted to normally hold the blades separated as shown in Fig. 2.

In use, the device is held by the handles and the legs inserted in the ground on each side of the hill of corn it is desired to hoe, the blades being brought as near together as possible around the stalks. The arms are then swung together and the blades cut and remove the weeds from around the stalk. The yoke frame steadies the device while the blades are being swung apart.

A device of this nature is adapted to operate quickly to effect the results desired with a minimum amount of labor. It is not adapted for cultivating, but simply for removing weeds, or hoeing when the corn is quite young.

In accordance with the patent statutes, I have described the principle of operation of my invention, together with the apparatus which I now consider to represent the best embodiment thereof, but I desire to have it understood that the apparatus shown is only illustrative and that the invention can be carried out by other means and applied to uses other than those above set forth, within the scope of the following claims.

Having described my invention, what I claim as new and desire to protect by Letters Patent, is:—

1. A device of the class set forth, comprising a yoke frame provided with a pair of legs to be inserted in the ground, a pair of blades hung between said legs, handles attached to said blades for swinging them, and a spring holding said blades normally apart.

2. A device of the class set forth, comprising, a yoke frame provided with legs to be inserted in the ground, blades hung between said legs, handles attached to said legs for swinging them, and means for holding said blades normally apart.

In testimony whereof, I have signed my name to this specification, in the presence of two subscribing witnesses.

FRANK VEJROSTA.

Witnesses:
　MORITZ HEIM,
　F. G. BRADBURY.